United States Patent Office 3,248,394
Patented Apr. 26, 1966

3,248,394
REACTION OF NITROSYL FLUORIDE WITH PERHALOOLEFINS AND SELECTED FLUORINE COMPOUNDS MADE THEREBY
Sam Andreades, Wilmington, Del., assignor to E. I. du Pont de Nemours and Company, Wilmington, Del., a corporation of Delaware
No Drawing. Filed May 24, 1961, Ser. No. 112,203
14 Claims. (Cl. 260—244)

This application is a continuation-in-part of applicant's copending application S.N. 38,454, filed June 24, 1960, and now abandoned.

This invention relates to, and has its principal objects provision of, a general method for preparing fluorine compounds, including certain copolymers, by interaction between nitrosyl fluoride and perhaloolefins and selected fluorinated oxazetidines and oxaazacyclohexanes made thereby.

Various organic fluorine-nitrogen compounds are known. In particular, fluorinated, substituted oxazetidines and their preparation from fluoronitrosoalkanes have been described in the literature (cf. Barr and Haszeldine, J. Chem. Soc. 1881 (1955)). Such fluorinated substituted oxazetidines have utility for various purposes.

The new compounds which are part of this invention are fluoroperhalo(2-ethyl-1,2-oxazetidines) and fluoroperhalooxaazacyclohexanes wherein all halogen atoms are of atomic numbers 9–35 (chlorine, fluorine and bromine). The preferred compounds are the oxaazacyclohexanes which are represented by the formula:

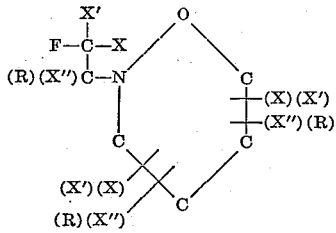

wherein X, X', and X'' are halogen of atomic number 9–35 and R is X, X', X'' or perhaloalkyl of up to 7 carbons in which all halogens are of atomic number 9–35, at least one of X, X' and X'' being fluorine. Preferably, each of X, X' and X'' is fluorine and R is perfluoroalkyl.

A new and useful method for preparing organic fluorine-containing compounds, including fluoroperhalo-(2 - ethyl - 1,2 - oxazetidines), fluoroperhalooxaazacyclohexanes and copolymers of fluoroperhaloolefins and nitrosyl fluoride, is provided by the process of this invention. This process involves the chemical reaction of nitrosyl fluoride, NOF, with a fluoroperhaloolefin of the type defined below at a temperature between 60° and 250° C.

The fluoroperhaloolefins employed in the process of this invention include any perhalogenated acyclic olefin of up to 9 carbons in which all halogens are of atomic numbers 9–35, inclusive, and in which there is at least one fluorine on one unsaturated carbon. The term "olefin" is used in its usual sense to denote an aliphatic hydrocarbon of the series $C_nH_{2n}$. Preferred fluoroperhaloolefins are those of 2 to 9 carbon atoms in which the ethylenic bond is between the first and second carbon atoms, i.e., 1-olefins. A still more preferred group of fluoroperhaloolefins comprises those in which there is a terminal difluoromethylene group.

The type of product formed in the reaction of this invention with the exception of the polymers, depends upon the particular fluoroperhaloolefin employed in the reaction with nitrosyl fluoride. Copolymers of fluoroperhaloolefin and nitrosyl fluoride are produced when any fluoroperhaloolefin as defined above, is utilized. When fluoroperhaloethylenes are employed, one mole of nitrosyl fluoride reacts with two moles of the fluoroperhaloethylene to form fluoroperhalo(2-ethyl-1,2-oxazetidines). When any fluoroperhalo-1-olefins, as defined above, are used, one mole of nitrosyl fluoride reacts with one mole of the fluoroperhalo-1-olefin to form 2-nitroso-fluoroperhaloalkanes; and when the fluoroperhalo-1-olefin is of the formula:

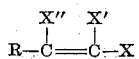

wherein X, X', X'' and R are as defined above, nitrosyl fluoride also reacts with three moles of the fluoroperhalo-1-olefin to form fluoroperhalo-1,2-oxaazacyclohexanes. When internal fluoroperhaloolefins are employed as reactants, two or more moles of nitrosyl fluoride react with the fluoroperhaloolefin to form acyclic fluorine-containing compounds such as nitrofluoroalkanes and fluoroalkyl nitrites, and to form acyclic fluoroperhaloacyl fluorides. Thus, it is evident that nitrosyl fluoride and the fluoroperhaloolefin react in different proportions depending on the particular fluoroperhaloolefin being employed, and that these starting materials are used to best advantage if they are present in the stoichiometric amounts required to produce the desired products. However, the reaction can be carried out with an excess of either reactant; but since an excess of nitrosyl fluoride usually results in the formation of more acyclic fluorine-containing compounds, it is preferred that an excess of the fluoroperhaloolefin be used when best yields of the oxazetidines or oxaazacyclohexanes are desired. Thus, in a preferred embodiment one can employ from 2 to 4 moles of fluoroperhaloolefin per mole of nitrosyl fluoride. Unreacted fluoroperhaloolefin can be recovered at the end of the reaction for reuse.

The reaction between the nitrosyl fluoride and the fluoroperhaloolefin is preferably carried out at a temperature between 100° and 250° C. The best temperature depends on the particular fluoroperhaloolefin being used as a reactant. For example, when tetrafluoroethylene or chlorotrifluoroethylene is the reactant, operating temperatures of 100–160° C. give good results (with reaction temperatures above 200° C., deleterious side reactions and decomposition of the oxazetidines take place); when hexafluoropropene is employed as a reactant, reaction temperatures of about 130° C. are preferred; and when octafluoro-2-butene is employed, reaction temperatures of 200–250° C. are satisfactory.

While the reaction can be carried out over a wide range of pressures, superatmospheric pressures are preferred, e.g., atmospheric to about 10,000 lb./sq. in. or higher. More preferred operating pressures are between about 1000 and 5000 lb./sq. in. The use of the higher pressures in the above ranges facilitates the production of higher yields of the fluoroperhalo oxazetidines and oxaazacyclohexanes, and allows the reaction to be carried out at lower temperatures, e.g., 100° C.

The reaction between the nitrosyl fluoride and the fluoroperhaloolefins should be carried out in the absence of atmospheric oxygen or moisture since nitrosyl fluoride reacts with water and oxygen to form undesirable by-products, and the nitrosyl fluoride is thereby lost.

The process of this invention is conveniently carried out by charging a cooled, e.g., to about −80° C., reaction vessel capable of withstanding high pressures with nitrosyl fluoride and an excess of the appropriate fluoroperhaloolefin, e.g., tetrafluoroethylene. The reaction vessel is then closed and heated to a reaction temperature between 100° and 200° C. until reaction is complete. The end of the reaction, e.g., with tetrafluoroethylene, is indicated by cessation of the decrease in internal pressure of the reaction vessel. Reaction times ranging from 2 to 20 hours or more are usually sufficient. The lower times are preferred in order to ensure higher yields of the oxazetidines, oxaazacyclohexanes, and their respective polymers.

After the reaction is completed, the crude reaction mixture is removed from the cooled reaction vessel and volatile products are isolated by fractional distillation and/or by vapor phase chromatography.

In addition to the volatile monomeric products isolated as described above, high-boiling polymeric oils are also produced in the reaction.

The use of a solvent or diluent is not essential in carrying out the process of this invention. However, an excess of fluoroperhaloolefin or an inert organic solvent, i.e., one that does not react with nitrosyl fluoride or the perhaloolefin under the operating conditions, can be used if desired. Examples of suitable inert solvents include perfluorodimethylcyclohexane, perfluoroethane, carbon tetrachloride, etc.

The fluoroperhalogenated olefin reactants used in the process of this invention can be of the grades that are ordinarily available. However, it is preferred that nitrosyl fluoride of as high purity as possible, preferably of 95% purity or higher, be used in order to avoid undesirable side reactions. For example, the presence of nitrogen dioxide in the nitrosyl fluoride reactant results in the formation of undesired nitro and nitroso compounds.

The process is carried out in reaction vessels constructed of materials that are inert to nitrosyl fluoride under the operating conditions. Examples of satisfactory materials are "Monel" metal, the alloy known commercially as "Hastelloy" C., and nickel. A preferred class of metallic reaction vessels are those containing nickel. The internal surfaces of metallic reaction vessels are preferably treated with a fluorinating agent before carrying out the processes of the invention. Such treatment can be effected simply by contacting the interior walls of such vessels with a gaseous fluorinating agent such as nitrosyl fluoride, fluorine, nitryl fluoride, or the like. Steel reaction vessels having a lining of polytetrafluoroethylene can also be employed.

The process of this invention is illustrated in greater detail in the following examples in which the proportions of ingredients are expressed in parts by weight unless otherwise stated.

*Example I*

O=N—F+2CF$_2$=CF$_2$ → CF$_3$CF$_2$—N——O + other products
　　　　　　　　　　　　　　　｜　　｜
　　　　　　　　　　　　　　　CF$_2$—CF$_2$ A high pressure-resistant reaction vessel made of the alloy known commercially as "Hastelloy" C and having a volume of 80 cc., is charged with 10 g. (0.2 mole) of nitrosyl fluoride and 20.3 g. (0.2 mole) of tetrafluoroethylene. The vessel is sealed and heated at 160° C. for 2 hours, during which time the internal pressure drops from 1350 to 725 lb./sq. in. After allowing the reaction vessel to cool to room temperature overnight, the gaseous reaction product (24 g.) in the vessel is isolated and distilled. The lower boiling, unreacted starting materials are first removed and the remainder is collected as a light blue fraction 1, boiling at 10–16° C. and amounting to about 1.8 g., and a colorless fraction 2, amounting to 8 g., the bulk of which has a boiling point of 22–23° C. Fraction 2 is identified as perfluoro(2-ethyl-1,2-oxazetidine) (32% conversion, 67% yield).

*Analysis.*—Calc'd for C$_4$F$_9$NO: C, 19.29%; F, 68.66%; N, 5.63%; N.W., 249. Found: C, 19.41%, 19.52%; F, 67.89%, 67.75%; N, 5.75%, 5.41%; M.W., 252. (By Victor Meyer method.)

The infrared, F$^{19}$ nuclear magnetic resonance and mass spectra are completely consistent with this structure. The F$^{19}$ nuclear magnetic resonance pattern consists of four peaks with area ratios close to the ideal of 2:3:2:2 at 430, 472, 1192, and 2000 cycles/sec. relative to trifluoroacetic acid as a standard.

Fraction 1 is resolved by gas phase chromatography into three components which are identified by infrared and mass spectroscopy as octafluorocyclobutane, 1-nitroso-2-nitrotetrafluoroethane and perfluoro(2-ethyl-1,2-oxazetidine).

In addition to the volatile products described above, there is obtained about 2.5 g. of high boiling oil which has properties indicating it to be a copolymer of nitrosopentafluoroethane and tetrafluoroethylene. Polymeric oils obtained in other experiments carried out as described in Example I have boiling points above 230° C.

*Example II*

Another preparation of perfluoro(2-ethyl-1,2-oxazetidine) is carried out in a manner similar to that described in Example I except that a lower operating temperature and a higher mole ratio (ca. 2:1) of olefin to NOF are employed. The reaction vessel of the type described in Example I is charged with 8 g. (0.16 mole) of nitrosyl fluoride and 29 g. (0.29 mole) of tetrafluoroethylene and heated at 100° C. for 8 hours. The pressure in the reaction vessel at the start of the run is 1170 lb./sq. in. and at the end of 8 hours reaction time it is 260 lb./sq. in. Using the isolation procedure described in Example I, there is obtained as fraction 1, 1.1 cc. (measured at −80° C.) of material boiling at −40° to +19° C. This is mainly unreacted nitrosyl fluoride. Fraction 2, boiling at 19–22.5° C., amounts to 2.5 g. and is slightly impure perfluoro(2-ethyl-1,2-oxazetidine). Fraction 2, boiling at 22.5–23.5° C., amounts to 14.0 g. Gas phase chromatography of Fraction 3 shows that it is 97% pure perfluoro (2-ethyl-1,2-oxazetidine). Fractions 2 and 3 combined, amounting to 16.5 g., represent a 68% yield of the oxazetidine after correcting for conversion.

There is also obtained 3.0 g. of a mixture of colorless polymeric oil and a white solid. This mixture is filtered and analysis of the filtrate indicates it to be a copolymer containing nitrogen, oxygen, fluorine and carbon.

*Analysis.*—Calc'd for C$_3$F$_6$NO: C, 20.02%; F, 63.33%; N, 7.8%. Found: C, 19.57%; F, 62.19%; N, 7.3%.

*Example III*

Another reaction of tetrafluoroethylene and nitrosyl fluoride is carried out in a manner similar to that described in Example I except that a higher operating temperature and a higher mole ratio (2:1) of olefin to nitrosyl fluoride are employed. The reaction vessel is charged with 5 g. (0.1 mole) of nitrosyl fluoride and 20 g. (0.2 mole) of tetrafluoroethylene and heated at 200° C. for 3 hours. During this time, the pressure in the reaction vessel is 425–450 lb./sq. in. After cooling the reaction vessel, therein is isolated 17.5 g. of volatile material and 1.5 g. of polymeric oil. This is distilled and there is obtained approximately 0.4 g. of polymeric oil, B.P. 90–96° C./3 mm. This oil is a low molecular weight polymer having the formula

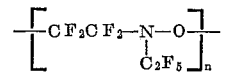

where $n$ is about 4.

*Analysis.*—Calc'd for C$_4$F$_9$NO: C, 19.3%; F, 68.7%. Found: C, 20.4%; F, 67.1%.

There is also obtained as a residue from the distillation approximately 1 g. of higher molecular weight polymer of the same general formula but with $n$ being higher than 4.

Infrared analysis of the 17.5 g. volatile fraction indicates the presence of COF$_2$ and CF$_2$=N—CF$_2$CF$_3$.

*Example IV*

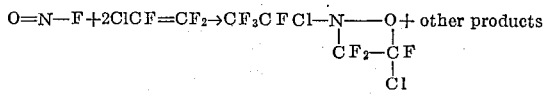

A reaction vessel of the type described in Example I, but of 240 cc. capacity, is charged with 20.0 g. (0.41 mole) of nitrosyl fluoride and 76 g. (0.65 mole) of chlorotrifluoroethylene. The vessel is closed and heated at 110° C. for 8 hours, during which time the pressure decreases from 75 atmospheres to 10 atmospheres. After cooling the vessel, there are recovered 28 g. of gaseous products and 70 g. of liquid products. Distillation of the liquid portion of the reaction mixture gives the following fractions:

| Fraction No. | Boiling Point, °C. | Amount, g. |
|---|---|---|
| 1 | 30–50 | 14.0 |
| 2 | 50–73 | 6.0 |
| 3 | 73–93 | 13.0 |
| 4 | 93–100 | 4.0 |
| 5 | 100–185 | 17.0 |
| Residue | | 3.0 |

Selected fractions are resolved into their components by vapor phase chromatography and the separated portions are analyzed by infrared and mass spectroscopy. In this manner, fraction 3 is found to contain N-(1-chloro-1,2,2,2 - tetrafluoroethyl) - 4-chloro-3,3,4-trifluorooxazetidine in a yield amounting to 10%. Fraction 3 also contains N - (1-chloro-1,2,2,2-tetrafluoroethyl)-3-chloro-3,4,4-trifluorooxazetidine and 1-nitro-1-chloro-1,2,2,2-tetrafluoroethane. Fraction 1 is found to contain 1,1,2-trichloro-1,2,2-trifluoroethane.

The distillation residue amounting to 3.0 g. is a polymeric oil.

Other fluoroperhaloethylenes can be substituted for the chlorotrifluoroethylene in the process of Example IV to yield different oxazetidines, polymers, cyclobutanes, nitroso-nitro compounds and other products of the types illustrated in Examples I–IV, as illustrated by the following examples.

*Examples V–IX*

| Ex. | Perhaloolefin | Oxazetidine Products [1] |
|---|---|---|
| V | Bromotrifluoroethylene. | N-(1-bromo-1,2,2,2-tetrafluoroethyl)-4-bromo-3,3,4-trifluorooxazetidine and polymeric oil. |
| VI | 1,1-dibromo-2,2-difluoroethylene. | N-(1,1-dibromo-2,2,2-trifluoroethyl)-4,4-dibromo-3,3-difluorooxazetidine and polymeric oil. |
| VII | 1,2-dichloro-1,2-difluoroethylene. | N-(1,2-dichloro-1,2,2-trifluoroethyl)-3,4-dichloro-3,4-difluorooxazetidine and polymeric oil. |
| VIII | Fluorotrichloroethylene. | N-(2,2-difluoro-1,1,2-trichloroethyl)-3-fluoro-3,4,4-trichlorooxazetidine and polymeric oil. |
| IX | 1,1-dichloro-2,2-difluoroethylene. | N-(1,1-dichloro-2,2,2-trifluoroethyl)-4,4-dichloro-3,3-difluorooxazetidine and polymeric oil. |

[1] Small quantities of the isomeric products will also be formed in Examples V, VI, VIII, and IX, viz, N-(1-bromo-1,2,2,2-tetrafluoroethyl)-3-bromo-3,4,4-trifluorooxazetidine, N-(1,1-dibromo-2,2,2-trifluoroethyl)-3,3-dibromo-4,4-difluorooxazetidine, N-(2,2-difluoro-1,1,2-trichloroethyl)-4-fluoro-3,3,4-trichloroxazetidine, and N-(1,1-dichloro-2,2,2-trifluoroethyl)-3,3-dichloro-4,4-difluorooxazetidine, respectively.

*Example X*

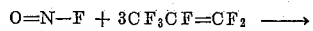

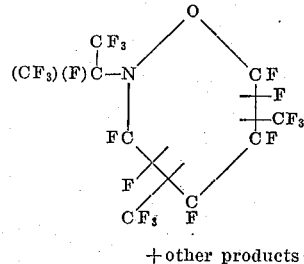

+ other products

A platinum tube is charged with 72.0 g. (0.48 mole) of hexafluoropropene and 15.0 g. (0.3 mole) of nitrosyl fluoride. The tube is sealed and heated under a pressure of 1300 lb./sq. in. at 120° C. for 13 hours. After cooling, the reaction tube is opened and the products are fractionally distilled. There is obtained a fraction boiling at 80–100° C. which is then separated into several constituents by vapor phase chromatography. The main portion of this fraction, amounting to approximately 39%, and 2 other minor portions are found by infrared and mass spectroscopy to be isomeric N-heptafluoroisopropyl-bis (trifluoromethyl) - 1,2-oxaazaperfluorocyclohexanes [erroneously identified in application S.N. 38,454 as perfluoro(2-isopropyl-3-methyl-1,2-oxazetidine) and perfluoro(2-isopropyl-4-methyl-1,2-oxazetidine)]. The positions of the trifluoromethyl groups on the oxaazacyclo hexane ring are not established. In addition to the above-described fluoroperhalo-1,2-oxaazacyclohexanes, there are also isolated from other distillation fractions by vapor phase chromatography, and identified by infrared and mass spectroscopy, the following compounds in appreciable amounts:

$(CF_3)_2CF—N=C(CF_3)_2$   $CF_3N=CFCF_3$
$(CF_3)_2CFONO$   $CF_3CF_2CF_3$
$(CF_3)_2CFNO$   $CF_3COF$
$(CF_3)_2CFNO_2$   $COF_2$
$(CF_3)_2CFN=CFCF_3$   $CF_3COCF_3$

There is also obtained as a residue from the fractional distillation 1–3 g. of a polymeric oil.

The following examples set forth the oxaazacyclohexanes that will be produced when the respective 1-olefins are substituted for hexafluoropropene in the process of Example X. It is to be understood that polymeric oils as well as a variety of organic fluorine containing compounds similar to those prepared in Example X will also be produced in each instance.

*Examples XI–XVII*

| Example | 1-olefin | Oxaazacyclohexanes |
|---|---|---|
| XI | 3-bromopentafluoro-1-propene. | 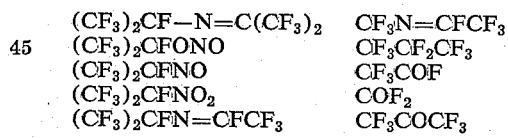 |

*Examples XI–XVII*—Continued

| Example | 1-olefin | Oxaazacyclohexanes |
|---|---|---|
| XII | 3,3,3-trichloro-1,1,2-trifluoro-1-propene. | Ring: (CCl$_3$)(F)C–N(CF$_3$)–O–CF(–F,–CCl$_3$)–CF–C(F)(CCl$_3$) with FC bridge |
| XIII | 2,4,4-trichloro-1,1,3,3,4-pentafluoro-1-butene. | Ring: (CFCl$_2$CF$_2$)(Cl)C–N(CF$_3$)–O–C(–(F)(F), –(Cl)(CF$_2$CFCl$_2$))–C(F)(F)–C(Cl)(CF$_2$CFCl$_2$) |
| XIV | Perfluor-1-hexene | Ring: (CF$_3$[CF$_2$]$_3$)(F)C–N(CF$_3$)–O–CF(–F,–(CF$_2$)$_3$CF$_3$)–CF–C(F)(CF$_3$(CF$_2$)$_3$) |
| XV | Perfluoro-1-heptene | Ring: (CF$_3$[CF$_2$]$_4$)(F)C–N(CF$_3$)–O–CF(–F,–(CF$_2$)$_4$CF$_3$)–CF–C(F)(CF$_3$(CF$_2$)$_4$) |
| XVI | Perfluoro-1-octene | Ring: (CF$_3$[CF$_2$]$_5$)(F)C–N(CF$_3$)–O–CF(–F,–(CF$_2$)$_5$CF$_3$)–CF–C(F)(CF$_3$(CF$_2$)$_5$) |
| XVII | Perfluoro-1-nonene | Ring: (CF$_3$[CF$_2$]$_6$)(F)C–N(CF$_3$)–O–CF(–F,–(CF$_2$)$_6$CF$_3$)–CF–C(F)(CF$_3$(CF$_2$)$_6$) |

*Example XVIII*

A reaction vessel of the type described in Example IV is charged with 21 g. of nitrosyl fluoride and 95 g. of octafluoro-2-butene. The vessel is closed and heated at 250° C. for 13 hours. The initial pressure of 190 atmospheres remains the same during the entire heating period. After cooling the reaction vessel, there are isolated 106 g. of gaseous product and 9 g. of a solid (probably nickel fluoride complex salts resulting from attack on the walls of the vessel). The gaseous product is fractionally distilled and the following fractions are isolated:

| Fraction No. | Boiling Point | Amount, ml. (measured at −80° C.) |
|---|---|---|
| 1 | −56° to −51° C | 12.8 |
| 2 | −51° to −5° C | 7.5 |
| 3 | −5° to 0° C | 20.0 |
| 4 | 0° to +8° C | 7.9 |
| 5 | 21° to 22° C | 1.8 g. |
| Residue | | ca. 2 g. |

Fraction 1 is found by infrared and mass spectroscopy to be essentially pure trifluoroacetyl fluoride. The other four fractions are analyzed by infrared and mass spectroscopy and resolved into their major components by vapor phase chromatography. Individual vapor phase chromatograph cuts are then analyzed individually by infrared and mass spectroscopy. In this manner, fraction 2 is found to contain 18% of perfluoropropionyl fluoride (along with perfluoro-n-propyl nitrite), 26% trifluoronitromethane, 23% trans perfluoro-2-butene, and 8% cis perfluoro-2-butene. Fractions 3 and 4 are largely the starting perfluoro-2-butene.

Other internal fluoroperhaloolefins, e.g., 1,4-dichloro-1,1,2,3,4,4-hexafluoro-2-butene, can be substituted for octafluoro-2-butene in the process of Example VI to yield diverse types of fluorine-containing compounds.

The examples have illustrated the process of this invention by describing the reaction of certain fluorinated perhaloolefins with nitrosyl fluoride. However, the process is operable with any fluorinated perhaloolefin in which the halogens have atomic numbers of 9–35, inclusive, and in which there is at least one fluorine on unsaturated carbon.

The fluoroperhalooxazacyclohexanes are non-inflammable; consequently, they are useful as fire extinguishers.

The fluoroperhalo(2-ethyl-1,2-oxazetidines) are useful for a variety of purposes, e.g., as gaseous dielectrics or as chemical intermediates. For example, thermal decomposition at 550° C. of perfluoro(2-ethyl-1,2-oxazetidine) yields $CF_3CF_2N=CF_2$ and $COF_2$.

Carbonyl fluoride is a well-known compound which is useful in many applications.

The foregoing detailed description has been given for clearness of understanding only and no unnecessary limitations are to be understood therefrom. The invention is not limited to the exact details shown and described, for obvious modifications will occur to those skilled in the art. Consequently, I propose to be bound solely by the appended claims.

The embodiments of the invention in which an exclusive property or privilege is claimed are defined as follows:

1. A process of preparing organic fluorine-containing compounds which comprises reacting nitrosyl fluoride with an acyclic perhaloolefin of up to 9 carbons in which all halogens are of atomic number 9–35 and in which there is at least one fluorine atom on an unsaturated carbon at a temperature of 60°–250° C., a pressure between about atmospheric and 10,000 lb./sq. in. and in the substantial absence of moisture and atmospheric oxygen.

2. The process of claim 1 wherein an excess of acyclic perhaloolefin is reacted with nitrosyl fluoride at a temperature of 100°–250° C. and a pressure between about 1000 and 5000 lb./sq. in.

3. The process of claim 1 wherein the perhaloolefin is tetrafluoroethylene.

4. The process of claim 1 wherein the perhaloolefin is octafluoro-2-butene.

5. The process of claim 1 wherein the perhaloolefin is hexafluoropropene.

6. The process of claim 1 wherein the perhaloolefin is perfluoro-1-hexene.

7. A cyclic compound selected from the class consisting of fluoroperhalo(2-ethyl-1,2-oxazetidines) wherein all halogens are of atomic number 9–35 and compounds of the formula:

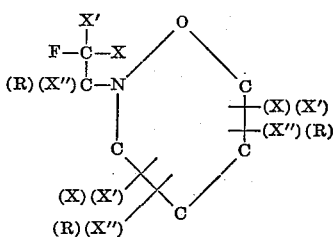

wherein X, X' and X" are halogen of atomic number 9–35 and R is selected from the group consisting of X, X', X" and perhaloalkyl of up to 7 carbons in which all halogens are of atomic number 9–35 at least one of X, X' and X" being fluorine.

8. A compound of the formula:

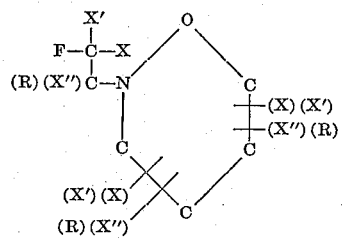

wherein X, X' and X" are halogen of atomic number 9–35 and R is selected from the group consisting of X, X', X" and perhaloalkyl of up to seven carbons in which all halogens are of atomic number 9–35, at least one of X, X', and X" being fluorine.

9.

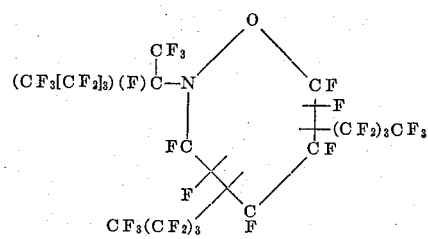

10. The process of claim 1 wherein the perhaloolefin is chlorotrifluoroethylene.

11. The process of preparing fluoroperhalo(2-ethyl-1,2-oxazetadines) and copolymers of fluoroperhaloethylenes and nitrosyl fluoride which comprises reacting a fluoroperhaloethylene wherein all halogens are of atomic number 9–35 with nitrosyl fluoride at a temperature of 60°–250° C.

12.

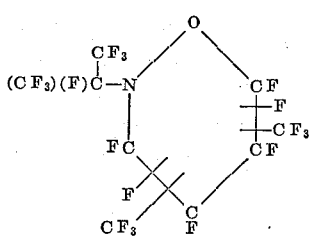

13. N-(1 - chloro - 1,2,2,2-tetrafluoroethyl)-4-chloro-3,3,4-trifluorooxazetidine.

14. N-(1 - chloro - 1,2,2,2-tetrafluoroethyl)-3-chloro-3,4,4-trifluorooxazetidine.

References Cited by the Examiner

UNITED STATES PATENTS

| | | | |
|---|---|---|---|
| 2,594,272 | 4/1952 | Kauck et al. | 260—333 |
| 2,594,322 | 4/1952 | Leonard | 260—333 |
| 2,806,031 | 9/1957 | Rigerterink | 260—244 |
| 2,807,628 | 9/1957 | Belleau | 260—333 |
| 2,811,523 | 10/1957 | Rigerterink | 260—244 |
| 3,004,961 | 10/1961 | Hauptschein | 260—92.1 |
| 3,012,021 | 12/1961 | Hauptschein | 260—92.1 |
| 3,014,015 | 12/1961 | Jewell | 260—92.1 |
| 3,072,625 | 1/1963 | Borders | 260—92.1 |

FOREIGN PATENTS 843,795   8/1960   Great Britain.

WALTER A. MODANCE, *Primary Examiner.*

NICHOLAS S. RIZZO, IRVING MARCUS, *Examiners.*